United States Patent [19]

Jodrey

[11] Patent Number: 4,855,005

[45] Date of Patent: Aug. 8, 1989

[54] WEB TRANSPORT MOTION COMPENSATION APPARATUS

[75] Inventor: Robert M. Jodrey, Westboro, Mass.

[73] Assignee: Dennison Manufacturing Company, Framingham, Mass.

[21] Appl. No.: 64,042

[22] Filed: Jun. 18, 1987

[51] Int. Cl.[4] .............................................. B32B 31/00

[52] U.S. Cl. .................................... 156/361; 156/495; 156/542; 156/552; 156/DIG. 13; 156/DIG. 28; 226/158

[58] Field of Search ............... 156/361, 366, 494, 495, 156/542, 238, 362, 363, 364, 540, 541, 552, DIG. 12, DIG. 26, DIG. 28, DIG. 33, DIG. 13; 74/569, 110, 567; 242/147 R, 75, 75.3; 226/113, 114, 124, 158

[56] References Cited

U.S. PATENT DOCUMENTS

| | | | |
|---|---|---|---|
| 2,589,096 | 3/1952 | Landergren | 74/110 |
| 2,981,432 | 4/1961 | Flood | 156/542 X |
| 3,434,902 | 3/1969 | Bliss | 156/542 |
| 4,381,211 | 4/1983 | Nechay | 156/542 |

FOREIGN PATENT DOCUMENTS

| | | | |
|---|---|---|---|
| 937071 | 9/1963 | United Kingdom | 156/364 |

*Primary Examiner*—Michael W. Ball
*Assistant Examiner*—David W. Herb
*Attorney, Agent, or Firm*—Arthur B. Moore; George E. Kersey

[57] ABSTRACT

A compensated web transport for decorators, in which the motion of the web is matched with that of a container being decorated. Controlled motion of the web is used to reduce distortion in the transfer of labels to irregularly shaped containers.

7 Claims, 6 Drawing Sheets

| LINE NO. | CORRECTION REQ. A | B | C | AVE. MILS. | ADD 145 | X .4375 |
|---|---|---|---|---|---|---|
| 0 | 0 | 0 | 0 | 0 | 145 | 64 |
| 5 | 30 | 45 | 50 | 43 | 188 | 82 |
| 10 | 50 | 75 | 65 | 58 | 203 | 89 |
| 15 | 5 | 10 | 20 | 12 | 157 | 69 |
| 20 | -80 | -55 | -50 | -55 | 90 | 39 |
| 25 | -90 | -100 | -105 | -96 | 49 | 21 |
| 30 | -95 | -110 | -110 | -100 | 45 | 20 |
| 35 | -65 | -80 | -70 | -70 | 75 | 33 |
| 40 | -10 | -15 | -5 | -12 | 133 | 58 |
| 45 | 15 | 25 | -45 | 30 | 175 | 77 |
| 50 | 20 | 45 | 60 | 42 | 187 | 82 |
| 55 | -10 | 20 | 15 | 15 | 160 | 70 |
| 60 | -100 | -45 | -60 | -60 | 85 | 37 |
| 65 | -150 | -90 | -130 | -128 | 17 | 7 |
| 70 | -160 | -130 | -150 | -145 | 0 | 0 |
| 75 | -140 | -110 | -130 | -128 | 17 | 7 |
| 80 | -105 | -55 | -95 | -80 | 65 | 29 |

DISTANCES ARE IN MILS.

Fig. 6

WEB TRANSPORT MOTION COMPENSATION APPARATUS

BACKGROUND OF THE INVENTION

The invention relates to web transport, and more particularly to web transport in heat transfer decorators.

One type of heat transfer decorator uses a carrier web to transport labels past a preheater, where each is heated, to a decorating site, where each label is pressed against the surface of an article to transfer it to the article.

Illustrative U.S. patents include: U.S. Pat. Nos. 2,981,432; 3,064,714; 3,079,979; 3,193,211; 3,208,897; 3,231,448; Re. 26,226; and 3,483,063.

In designing a suitable web transport or label carrier for decorators, it is desirable that the motion of the web at the decorating site match that of the article. The labels must also be properly registered with the article surface during decoration. Additionally the web must be maintained at a suitable tension throughout its length.

As illustrated for example in U.S. Pat. No. 3,079,979, FIG. 2, a label carrier employed can have a label bearing portion with periodically spaced labels, and a margin for evenly spaced sprocket holes. The label carrier web is fed from an unwind roll through a series of "dancer" and "idler" rolls to a metering roll, and thence past a preheater and through the decorating site, and further dancer and idler rolls to a rewind roll. The metering roll includes a peripheral sprocket which engages the sprocket holes of the web to register the speed of the web and control the average web speed. Shuttle rolls are mounted astride the label transfer site on a reciprocating label shuttle, which accelerates the local web speed when extending, and decelerates the web speed when retracting. This permits a closer spacing of labels on the carrier web. The web is pulled through the various transport stations by the takeup reel, which rotates at a surface speed matching that of the metering roll. Brake and clutch assemblies at the unwind and takeup reels respectively, together with dancer rolls, provide torque adjustments for the reels to regulate web tension.

This prior art web transport system has proven quite satisfactory in operation, but encounters certain disadvantages attributable to the use of non-circular containers being used with a round type turret. The system cannot properly accelerate the web or the container surface during transfer of the label to non-circular containers. Oval shaped containers for example are frequently used to package consumer products. Such oval shaped containers, using heat transfer decorators with round type turrets, rotate at a constant angular velocity. As a result they suffer distortion of the labels upon transfer because the velocity of the label receptive surface does not match that of the carrier web at all times during the transfer interval.

Accordingly, it is an object of the invention to provide an improved web transport system, particularly for heat transfer decorators. A related object is to achieve a web transport which regulates web speed at the decorating site to reduce distortion in the labelling of irregularly shaped containers.

SUMMARY OF THE INVENTION

The above and additional objects are realized in a web transport system which reduces the distortion of labels during transfer, particularly to irregularly shaped containers. This system makes use of web speed adjustment by a cam mechanism.

Label transfer machines can label all sides of a container, for example, by means of a rotating turret. Such turrets normally rotate a circular article at a constant angular velocity. However, irregularly shaped articles rotated at a constant angular velocity have significant variations in surface speed. The speed of a particular point on the surface is dependant on its distance from the axis of rotation. Points further from the axis have a higher speed than points on the surface closer to the axis. The non-cylindrical, label receiving surface of a container typically has a significant speed differential with the label bearing web at some points during transfer. The present invention corrects the speed of the web at those points on the surface of the article where the speed of the label receptive surface differs from the speed of the web. By matching the speeds of the web and the label receiving surface of the container, a significant distortion of the label upon transfer is avoided.

In accordance with one aspect of the invention a moveable non-rotating cam is constructed where the cam follower is rigidly attached to a roller in the web transport path. The cam profile is designed to alter the speed of the web during transfer of the label to a particularly shaped article. The cam is linearly displaced by a reciprocating label shuttle bracket. The label shuttle normally accelerates the web for label transfer then decelerates the web after label transfer to permit closer spacing of labels on the carrier web. As the shuttle moves during the label transfer interval, the cam, mounted on the shuttle, displaces a roller. This roller in turn either retards or accelerates the web further so that the speed of the label receptive surface more closely approximates the speed of the web at all times during the label transfer interval.

In accordance with a further aspect of the invention, the cam is designed to match a specific irregular surface. The more the shape of the article to be labelled deviates from a cylinder, the greater the web velocity correction necessary to reduce or avoid distortion. The cam profile is determined by first labelling the article by heat transfer with a pattern, normally consisting of evenly spaced vertical lines. An additional piece of the same pattern is then attached adjacent the labelled pattern so that the lines of both patterns are parallel. The distances between the correlated vertical lines of the two patterns are than measured along the boundary between patterns, perpendicular to the vertical lines. These distances indicate the amount of distortion of the label due to the web/container velocity differential at intervals on the label receptive surface. These distances are used in formulating the cam profile.

BRIEF DESCRIPTION OF THE DRAWINGS

FIG. 6 is a table of data from three oval containers, and average values for cam displacement in correcting web velocity.

DETAILED DESCRIPTION

With reference to the drawings, FIGS. 1–7 disclose a heat transfer decorator with web velocity compensation in accordance with the invention.

Figure 1:
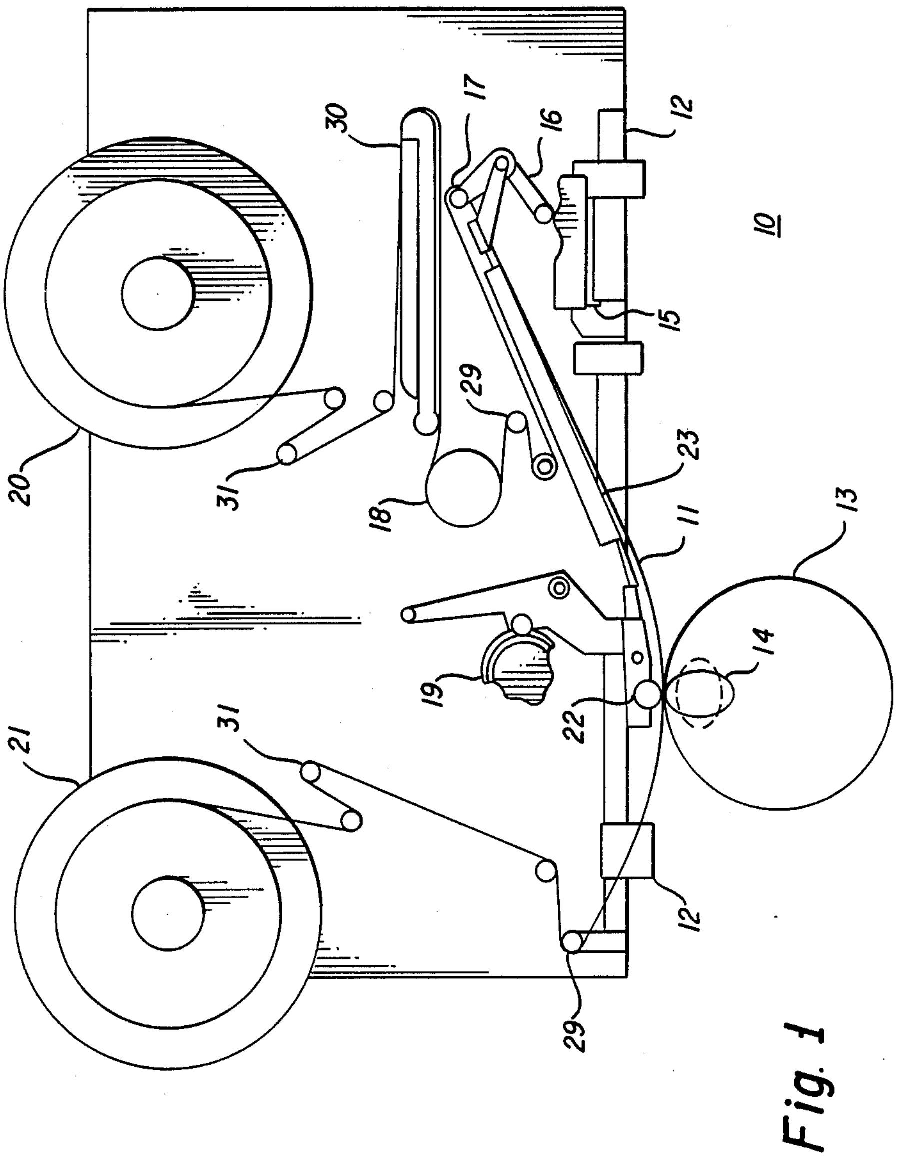
FIG. 1 is a plan view of a heat transfer decorator in accordance with the invention.

As shown in the plan view of FIG. 1, a decorator 10 includes a label bearing carrier web 11 routed from an unwind reel 20, through various transport control and label processing stations, to a takeup reel 21. The principal transport elements of the carrier web are a metering roll 18, a label scanner 30, a shuttle 12 with attached shuttle rolls 29, and tension control devices 31 associated with the unwind and takeup reels. A label preheater 23 and a transfer or platen roll 22 together preheat labels on the web 11 and transfer them to articles using heat and pressure. A bottle or other article 14 is carried by turret 13 into proximity with the carrier web 11, and a transfer roll 22 impresses the heated label against the bottle for label transfer. A cam 19 is used to move the transfer roll 22 in such a manner that the roll follows the surface contour of the bottle 14 as it is being rotated about its own axis during label transfer.

Control over web transport in accordance with the invention is by a shuttle cam 15, a cam follower roller 27 on an arm 16 and a web bearing roller 17, as discussed in further detail herein.

The metering roll 18, in conjunction with label shuttle 12, provides intermittent web motion at the decoration site. Thus, the web is normally advanced at a predetermined speed during decoration, but stops or retracts during interim periods. This allows close spacing of labels on the carrier web 11. The intermittent web motion is regulated by a signal from the scanner assembly 30. This control signal actuates and deactuates clutch and brake assemblies within the metering roll 18 as moderated by a master timing mechanism.

Figure 2:
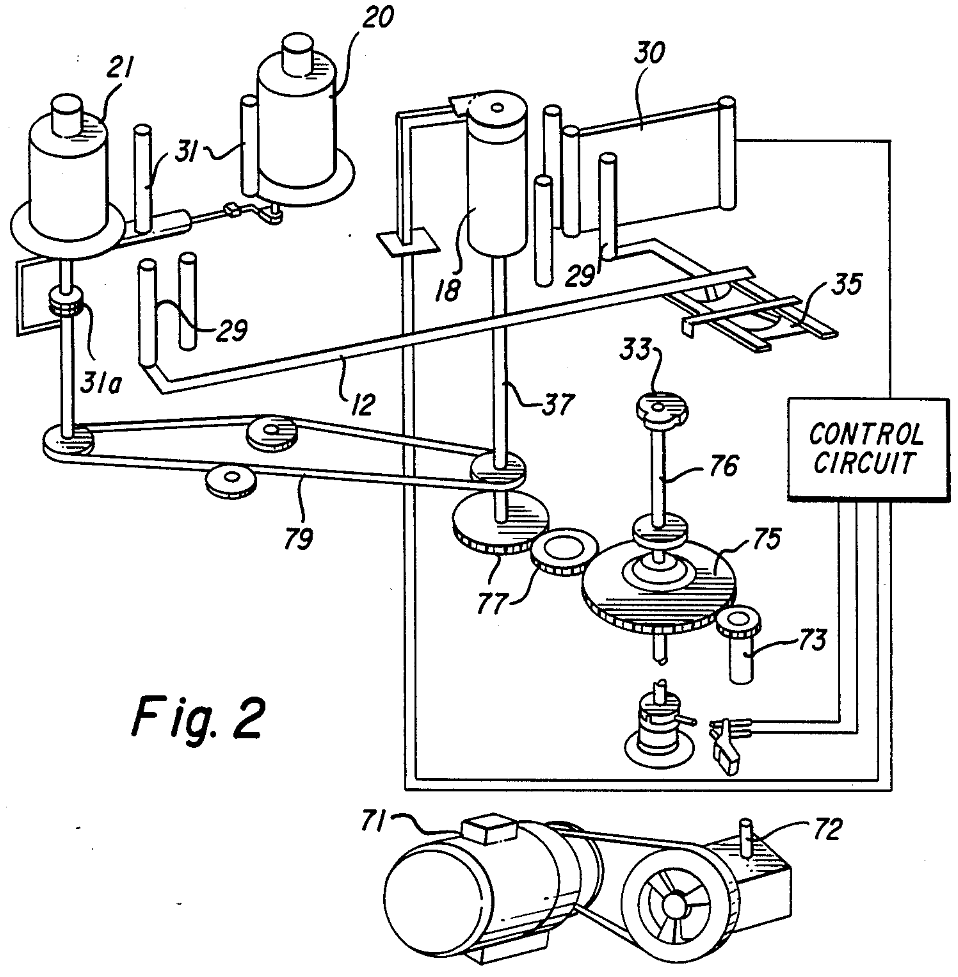
FIG. 2 is a perspective sectional view of drive and control systems for the decorator of FIG. 1.

With reference to FIG. 2, the timing mechanism is controlled by a driven heart shaped cam 33 to coordinate web transport with other machine functions. The shuttle 12, along with mounted shuttle rolls 29, are reciprocated by a label shuttle slide 35 in response to the rotation of the heart cam 33. A similar mechanism controls the motion of turret 13.

FIG. 2 also provides a schematic view of various drive components of the decorator 10 used in transporting the carrier web 11 (omitted in FIG. 2 for clarity), as well as associated control apparatus. Drive shaft 72 is driven from motor 71 to provide the basic mechanical input for the decorator 10. These mechanisms induce the rotation of the metering roll shaft 37 via gear 73, heart cam gear 75, and gears 77. Rewind roll 21 is driven from the metering roll shaft 37 by chain 79. The takeup reel 21 includes a tension control assembly 31 to contLol its rotation via clutch 31*a;* a similar tension control assembly located at the unwind reel regulates a brake (not shown).

Heart cam 33 at the top of the heart cam shaft 76 regulates the reciprocation of shuttle 12 as discussed above. The heart cam shaft controls the intermittent rotation of metering roll 18 primarily via a timing device assembly located on the heart cam shaft 76. The heart cam rotation provides a basic timing input to the other moving parts of decorator 10 via mechanisms not shown.

Figure 3:
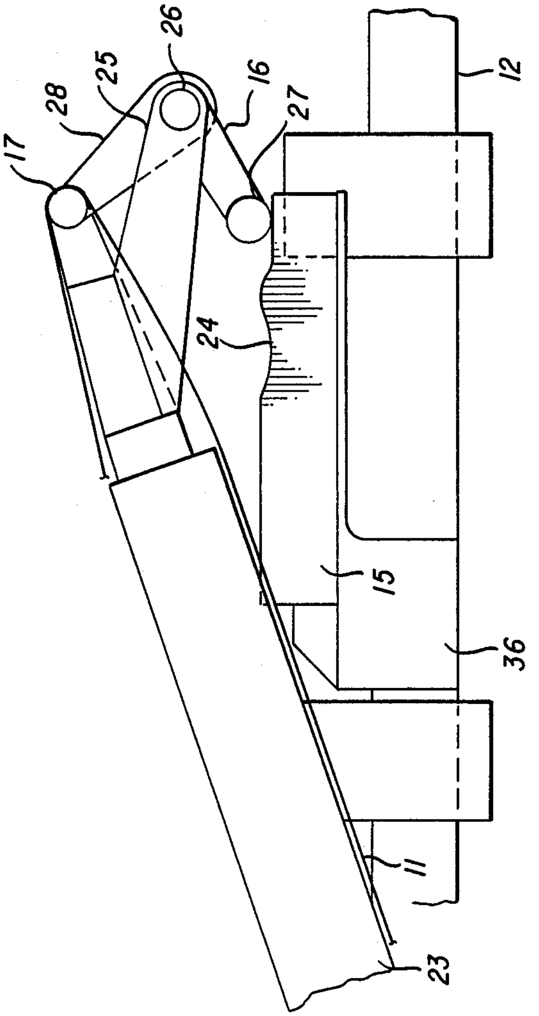
FIG. 3 is a sectional view of a cam mechanism in relation to a preheater and label shuttle bracket.

FIG. 3 illustrates a pan view of a preferred embodiment of the invention where a cam 15 is affixed to the label shuttle bracket 36 which in turn is mounted on the label shuttle 12. As the label shuttle 12 reciprocates back and forth, the cam profile 24 displaces a cam follower 27. The cam follower is mounted on arm 16 which is rigidly attached to a rotatable shaft 26. The rotatable shaft 26 is supported at the top and at the bottom by a pair of bearing brackets 25, which in turn-,are rigidly mounted to the preheater 23. Also rigidly attached to the top and bottom of rotatable shaft 26 are two arms 28 which support roller 17. The two arms 28 displace the web bearing roller 17 as the cam follower 27 follows the cam profile 24. Cam follower 27 is kept in contact with the cam profile 24 by virtue of the force exerted on roller 17 by the tension in the label web 11. The displacement of roller 17 operates to slow or accelerate the web speed at the transfer site.

Figure 5:
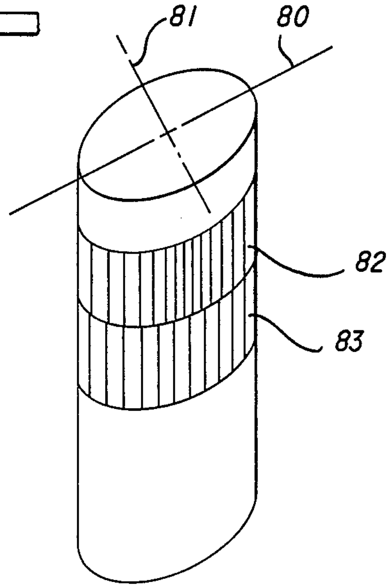
FIG. 5 is a perspective view of an oval container illustrating the measurement of web corrections.

When decorating cylindrical containers the cam profile 24 is a straight line because no compensation is necessary. In the case of irregularly shaped containers, such as the oval 14 illustrated in FIG. 1, the point at which the speed of the label receptive surface differs from the web speed in the transfer cycle is where the cam profile deviates from a straight line. The greater the speed differential, the greater the correction that is necessary to offset the differential. In the case of oval shaped articles the greatest correction is necessary at the surface along the oval's minor axis 81 as shown in FIG. 5. No correction is necessary at the surface along the major axis 80 of the oval where the system is otherwise set to label cylinders with with a radius identical to the radius of the oval along the major axis.

Figure 4:
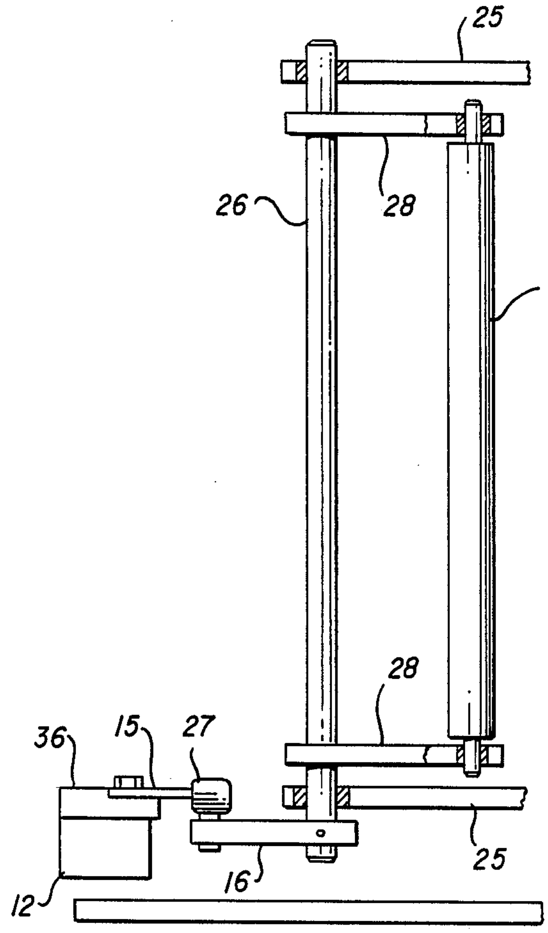
FIG. 4 is a side view of the cam mechanism in relation to the label shuttle bracket.

FIG. 4 illustrates a side view of the cam mechanism in a preferred embodiment of the invention. The cam 15 may consist of a rectangular piece of metal machined to the desired dimensions. The cam 15 is mounted on the label shuttle bracket 36 which in turn is mounted on label shuttle 12. The cam follower 27 is mounted on arm 16 which is rigidly affixed to rotatable shaft 26. Top and bottom bearing brackets 25 are rigidly mounted to the preheater 23, and act to support the rotatable shaft 26. Top and bottom arms 28 are rigidly attached to the rotatable shaft 26 and support the roller 17. The roller 17, around which the web 11 passes, is displaced when the cam follower is driven by the linear motion of the cam.

A non-cylindrical container of specified shape requires a distinct cam profile. This profile is determined by the method illustrated in FIGS. 5–7. FIG. 5 depicts an oval shaped container which has been labelled using a heat transfer label with a pattern of evenly spaced vertical lines. The spacing between the lines of the pattern 82 has been distorted upon label transfer as indicated in FIG. 5 due to the difference between the speed of the label receptive surface and the speed of the carrier web at the instant of transfer.

A sample 83 of the label web is then attached to the article adjacent the labelled pattern. The degree of distortion may be numerically represented by measuring the displacement of each line of the labelled pattern from each correlating line on the attached label web.

FIG. 6 is a table illustrating this technique on a particularly shaped container. Three containers A, B and C all having the same shape are used so that average values may be obtained for the required web corrections.

Figure 7:
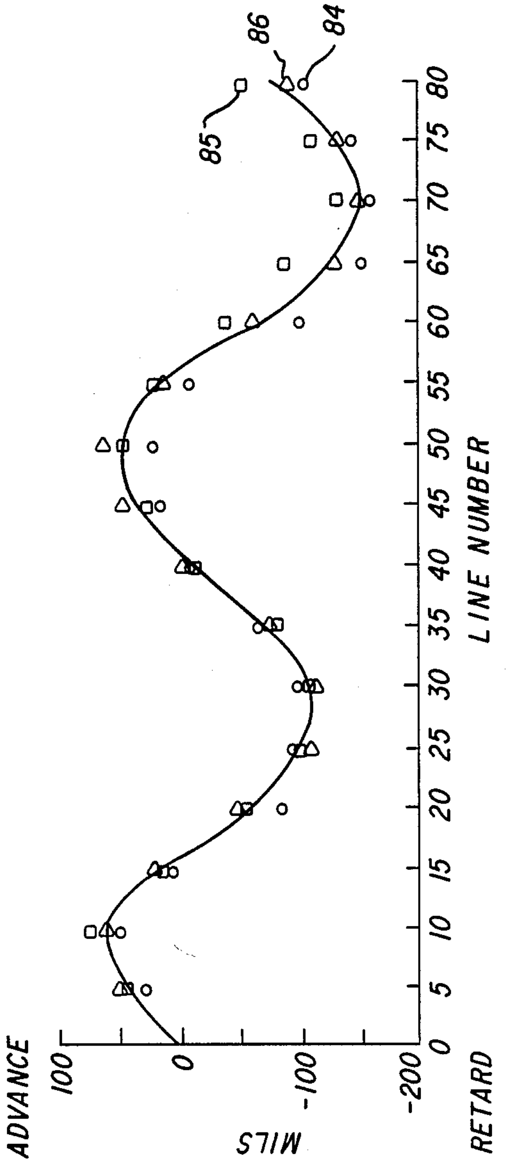
FIG. 7 is a graphical illustration of the data in FIG. 6.

This is necessary because of minor variations normally encountered in the labelling of individual containers. The pattern consists of 80 lines with measurements taken at every fifth line. The displacement or distortion of every fifth line on bottles A 84, B 85, and C 86 is measured and the required correction is graphically illustrated in FIG. 7 along with a curve through the approximate average of the three samples at each line. Those points above zero represent lines that have to be advanced on the container by speeding up the web while those values below zero represent lines that have to be retarded on the container by slowing the web. As the lowest average value was −145, the averages were normalized in column six of FIG. 6 by adding 145 to each averaged correction factor. This gives a positive value to the cam displacement at each line which simplifies cam manufacture. Column seven of FIG. 6 is included to adjust for the difference in length between arms 28 and 16, and also to take into account the fact that, because of the 180 degree wrap of the label web 11 around the web roll 17, the web roll need only be moved a distance equal to one-half the desired amount of correction on the container. In this example the arms 28 between the rotatable shaft 26 and the web bearing roller 17 are 2 inches in length, whereas the cam follower arm 16 between the cam follower 27 and the stationary column 26 is 1.75 inches in length. The average displacement is multiplied by a factor of 1.75/2.0 to account for the difference in arm lengths and by a factor of ½ to account for the 180 degree wrap of the label web around the web bearing roller. This gives the necessary displacement of the cam follower at each line. The curved average of FIG. 7 provides the continuous values of the cam follower displacement necessary to provie the changes in web speed for this particularly shaped container.

Each container shape, if sufficiently different, will require its own cam design in order to obtain the desired distortion free transfer of labels.

The invention provides a simple means for obtaining the distortion free labelling of irregularly shaped articles without the necessity of more expensive and substantial alterations in decorator operation.

I claim:

1. Improved apparatus for routing a label carrier web through a label application site in coordination with the surface motion of an article to be decorated, of the type including a web carrying a plurality of labels; means for routing the web over a transport path including the label application site; a shuttle carrying a pair of shuttle rollers for engaging the web at opposite sides of the application site and for regulating the motion of the web through the application site; and means for reciprocating the shuttle and shuttle rolls;

wherein the improvement comprises web compensation means including a profiled cam mounted to said shuttle for modulating the feed of said web between the upstream of one of said shuttle rollers and said application site by varying the motion of a third roller which engages the web, thereby controlling the rate of feed of said web through the application site.

2. Apparatus as defined in claim 1 wherein the profiled cam comprises a linear cam fixedly mounted to said shuttle, and said web compensation means further comprises a cam follower linkage for moving the third roller in accordance with a profile of said linear cam.

3. Apparatus as defined in claim 2 wherein the cam follower linkage comprises a pivotally mounted arm carrying a cam follower member which tracks a surface defining the cam profile, said third roller being fixedly coupled to said arm.

4. Apparatus as defined in claim 2 wherein said cam controls the velocity of the web so as to approximately match the speed of the label receptive surface one each article with the speed of the web during the label application interval.

5. Apparatus as defined in claim 1 wherein said articles are non-cylindrical in shape.

6. Improved apparatus for routing a label carrier web through a label application site in coordination with the surface motion of an article to be decorated, of the type including a web carrying a plurality of labels; means for routing the web over a transport path including the label application site, a shuttle carrying a pair of shuttle rollers for engaging the web at opposite sides of the application site and for regulating the motion of the web through the application site; and means for reciprocating the shuttle and shuttle rolls; wherein the improvement comprises a linear cam fixedly mounted to said shuttle;

a third roller for engaging the web between the upstream one of said shuttle rollers and said application site; and a cam follower linkage for moving the third roller relative to the motion of said shuttle roller, in accordance with a profile of said linear cam, thereby to modulate the rate of feed of the web through the label application site.

7. Apparatus as defined in claim 6 wherein the cam follower linkage comprises a pivotally mounted arm carrying a cam follower member which tracks a surface defining the cam profile, said third roller being fixedly coupled to said arm.

* * * * *